US011117110B2

(12) United States Patent
Van Uffelen et al.

(10) Patent No.: US 11,117,110 B2
(45) Date of Patent: Sep. 14, 2021

(54) METHOD FOR REDUCING TEMPERATURE SPREAD IN REFORMER (71) Applicant: Technip France, Courbevoie (FR)

(72) Inventors: Roland Van Uffelen, Zoetermeer (NL); Stephane Walspurger, Amstelveen (NL)

(73) Assignee: Technip France, Courbevoie (FR)

( * ) Notice: Subject to any disclaimer, the term of this patent is extended or adjusted under 35 U.S.C. 154(b) by 88 days.

(21) Appl. No.: 16/075,732

(22) PCT Filed: Feb. 3, 2017

(86) PCT No.: PCT/EP2017/052385
§ 371 (c)(1),
(2) Date: Aug. 6, 2018

(87) PCT Pub. No.: WO2017/134225
PCT Pub. Date: Aug. 10, 2017

(65) Prior Publication Data
US 2019/0076807 A1 Mar. 14, 2019

(30) Foreign Application Priority Data
Feb. 4, 2016 (EP) .................................. 16154314

(51) Int. Cl.
*B01J 8/06* (2006.01)
*C01B 3/38* (2006.01)
*F23C 5/08* (2006.01)

(52) U.S. Cl.
CPC .............. *B01J 8/062* (2013.01); *B01J 8/065* (2013.01); *C01B 3/384* (2013.01); *F23C 5/08* (2013.01);
(Continued)

(58) Field of Classification Search
CPC .............. B01J 8/062; B01J 2208/00504; B01J 19/2425; B01J 2208/00548; B01J 19/0013; B01J 19/006; B01J 19/2415; B01J 2208/00044; B01J 2208/00212; B01J 2208/00539; B01J 2219/00038; B01J 2219/00087; B01J 2219/00763; B01J 2219/185; B01J 2219/2401; B01J 8/025;
(Continued)

(56) References Cited

U.S. PATENT DOCUMENTS

| 2003/0012700 A1* | 1/2003 | Carnahan | ............... G01N 31/10 422/400 |
| 2006/0179718 A1* | 8/2006 | Whyatt | ................. B01F 5/0604 48/198.7 |

(Continued)

FOREIGN PATENT DOCUMENTS

| EP | 2671634 A1 | 12/2013 |
| JP | 2002201003 A | * 7/2002 |
| JP | 2015174808 A | * 10/2015 |
| WO | WO2009003647 A1 | 1/2009 |

*Primary Examiner* — Imran Akram
(74) *Attorney, Agent, or Firm* — Verrill Dana, LLP (57) ABSTRACT The invention is directed to a method for heating a process gas in a top or bottom fired reformer, a method for improving the temperature spread over a top or bottom fired reformer, and to a top or bottom fired reformer wherein these methods can applied. This can be achieved by the lane flow rate of at least one outer tube lane being different from the lane flow rate of at least one inner tube lane.

16 Claims, 9 Drawing Sheets (52) U.S. Cl.
CPC .............. *B01J 2208/00504* (2013.01); *B01J 2208/00548* (2013.01); *C01B 2203/0227* (2013.01); *C01B 2203/0816* (2013.01); *C01B 2203/141* (2013.01); *C01B 2203/169* (2013.01); *C01B 2203/1619* (2013.01)

(58) Field of Classification Search
CPC ...... B01J 8/0257; B01J 8/0278; B01J 8/0285; B01J 8/065; B01J 8/067; C01B 2203/0816; C01B 2203/141; C01B 3/384; C01B 2203/1017; C01B 2203/1258; C01B 2203/1619; C01B 2203/169
See application file for complete search history.

(56) References Cited

U.S. PATENT DOCUMENTS

| | | |
|---|---|---|
| 2010/0140552 A1 | 6/2010 | Ammouri et al. |
| 2012/0078408 A1* | 3/2012 | Li ................ C01B 3/384 700/105 |
| 2015/0129193 A1* | 5/2015 | Gallarda ......... B01J 19/0013 165/276 |
| 2015/0175416 A1 | 6/2015 | Jensen et al. |
| 2016/0076761 A1* | 3/2016 | Toqan ................ F23L 7/00 431/4 |
| 2016/0280540 A1* | 9/2016 | Finnerty ............... B01J 8/24 |
| 2018/0363612 A1* | 12/2018 | Okamoto .......... F02M 51/0664 |

* cited by examiner

METHOD FOR REDUCING TEMPERATURE SPREAD IN REFORMER

The invention is directed to a method for heating a process gas in a top or bottom fired reformer, a method for improving the temperature spread over a top or bottom fired reformer, and to a top or bottom fired reformer wherein these methods can be applied.

A reformer is a furnace wherein a hydrocarbon gas such as natural gas (hereinafter referred to as process gas) is converted to form a mixture of CO and hydrogen in the presence of a catalyst, typically a metal-based catalyst (in particular, nickel). This method of producing hydrogen is also known as steam reforming. The conversion reaction needs to be conducted at high temperatures, for example temperatures of at least 700° C. The heat necessary for the endothermic conversion of the process gas is supplied by combusting a fuel with an oxidant (e.g. oxygen or air). The combustion is controlled by burners, placed on the top (a top fired reformer) or bottom (bottom fired reform) of the reformer chamber. The process gas is heated in the chamber by flowing it through reformer tubes downwardly (in case of a top fired reformer) or upwardly (in case of a bottom fired reformer) towards the other end (bottom or top) of the reformer chamber. The reformer tubes may also be referred to as catalyst tubes, because these tubes comprise the catalyst required for the conversion reaction.

A top or bottom fired reformer comprises alternating lanes of burners (burner lanes) and reformer tubes (tube lanes). The reformer further comprises a reformer chamber confined within refractory walls, i.e. a number of side walls (typically four), a refractory top wall (top) and a refractory bottom wall (bottom). Each burner lane is positioned in between two tube lanes or in between an outer tube lane and a side wall of the reformer chamber.

A tube lane that lies nearest to a side wall of the reformer chamber is called an outer tube lane. Thus, there are always two outer lanes of reformer tubes in a top or bottom fired reformer. The other lanes of reformer tubes are called inner tube lanes and lie in between the outer tube lanes. Accordingly, the configuration of the lanes in a reformer with four tube lanes and five burner lanes will be: B-O-B-I-B-I-B-O-B (wherein B=burner lane; O=outer lane of reformer tubes; and I=inner lane of reformer tubes).

Most burner lanes have two tube lanes lying adjacent to them, in which case the burner lane supplies heat directly onto two tube lanes. However, this is not the case for the burner lanes that lie directly adjacent to a side wall (referred to as side burner lanes). A side burner lane supplies energy directly only to one tube lane, i.e. to the outer tube lane lying adjacent to the side burner lane. This will generally result in temperature differences between the different tube lanes, in particular between the outer tube lanes and the inner tube lanes. Therefore, the burners in the side burner lane usually are given a lower duty than the burners in the other (center) burner lanes. Typically, the duty of the burners in a side burner lane is between 50-100% of the duty of center burner lane, more specifically between 50 and 70%. Duty is a parameter representing the heat release of a burner and is expressed in $J \cdot s^{-1}$.

While the exact duty of the burners of the side lane can be theoretically calculated with a simple box model, the flow patterns of the hot flue gases in the reformer chamber were found to depend on many different parameters including (amongst others) the presence and type of flue gas extraction devices, gas velocity variation from one burner to the other, burner interaction of the side burners with the side wall of the reformer chamber, heat absorption variation from one tube to the other.

Therefore, making an accurate prediction of flow patterns in the reformer is very complex. As a consequence predicting the required side lane heat release cannot be done with high accuracy. There is a need for a method or reformer with which the temperature distribution in the reformer chamber can be balanced.

Depending on the duty of the side burner lane, the outer tube lanes may be higher or lower in temperature than the inner tube lanes. For example, the inner tube lanes of poorly balanced reformers may be more than 30° C. hotter or cooler than the side lanes.

The non-uniformity of the temperature distribution over the reformer chamber is undesirable. First, it may affect the performance of the reformer including catalyst tube life time. Second, it is energy inefficient, and thus also cost inefficient. Third, it may affect the choice of material and design parameters such as tube thickness that are dictated by the hottest elements in the reformer. Therefore, it is an object of the invention to improve the temperature spread over the reformer chamber.

Different methods are known in the art to decrease burner interaction of the side burners with the chamber wall.

US 2011/0220847 is directed to reducing furnace instabilities and $NO_x$ production, for example by reducing or eliminating burner interaction with the reformer wall and reduce or eliminate localized overheating. It describes a method of combustion in a top or bottom fired reformer, wherein the side burners have one or more injection properties different from the center burners. The injection properties include the angle, flow rate, amount and location of the oxidant injectors and the amount and location of the fuel injectors of the burners.

US 2007/0099141 describes a method for generating a straightened flames from a burner in a furnace. The straightened flames are said to avoid localized overheating of process tubes and chamber walls caused by deflected flames from undesirable gas flow patterns in the furnace chamber.

US 2007/0128091 is directed to improving the heat distribution and heat transfer in synthesis furnaces. This is said to be achieved in that the outer burners that are located in the vicinity of the furnace wall have a burner exit direction, which runs at an incline away from the center of the furnace in relation to the vertical, leading away from the center of the furnace.

A disadvantage of adjusting the heat supply of individual burners as described above is that the solutions are based on empirical methods and CFD modelling and both may produce incorrect results requiring modifications to the design when temperature deviations are observed. Hence, often balancing of burner duty is practiced, whereby the fuel or oxidant flowrate to individual burners is manipulated to improve temperature distribution. However, a disadvantage of manipulating the burners is that it may give rise to safety issues since the flame stability limits (heat release and air to fuel ratio) are normally safeguarded on global level (for the entire reformer) and can not recognize the flame stability limits on individual burners.

It is further known in the art to adjust the temperature of individual heating tubes in a furnace.

EP 2 671 634 describes a method for decreasing the spread of the tube temperatures between tubes in a process involving the heating of at least one fluid in a furnace. In the method, it is first determined which 50% of the tubes have the lowest temperature. Subsequently, the flow of the fluid distributed entering in these tubes is reduced. The reduction in flow is achieved by installing a pressure drop element at the inlet of individual tubes. Half of all reformer tubes need to be treated in this way. This method requires that the operation of decreasing the flow is to be realized during a shut down of the installation.

US 2010/0140552 relates to a method for controlling a steam reforming process, wherein the wall temperature of each tube is measured and, if the temperature is higher than the desired maximum operating temperature (MOT), at least one operating parameter of the reforming process is modified so as to lower the temperature.

An object of the invention is therefore to improve the temperature spread and/or temperature distribution in a reformer, without requiring manipulation of the burners. Thus, an appropriate safeguarding for the reformer on global level can be ensured.

A further object of the invention is to be able to balance the temperature distribution in a reformer.

It is a further objection of the invention to be able to balance the temperature distribution in a reformer during operation of the reformer.

More in particular, it is an object to reduce the temperature spread in a reformer and/or to provide the reformer with a more uniform temperature distribution. This object includes decreasing the temperature difference between the outer tube lanes and the inner tube lanes.

It is further an object to achieve the above objects without negatively affecting the temperature variation within a tube lane and/or giving rise to safety issues.

In a first aspect, the invention is directed to a method for improving the temperature distribution in a top or bottom fired reformer comprising two outer lanes of reformer tubes and one or more inner lanes of reformer tubes, the method comprising flowing process gas through the reformer tubes of the inner and outer lanes, wherein each tube lane has a lane flow rate, which is defined as the total amount of process gas that flows through the reformer tubes of said tube lane per unit time, wherein the lane flow rate of at least one outer tube lane is set to be different from the lane flow rate of at least one inner tube lane, in particular by setting the lane flow rate of said outer tube lane upstream of the reformer tube inlets.

In a further aspect, one or more of these objects are met by providing a method for heating a process gas in a top or bottom fired reformer comprising two outer lanes of reformer tubes (outer tube lanes) and one or more inner lanes of reformer tubes (inner tube lanes), the method comprising flowing process gas through the reformer tubes of the inner and outer tube lanes, wherein each tube lane has a lane flow rate, which is defined as the total amount of process gas that flows through the reformer tubes of said tube lane per unit time, wherein the lane flow rate of at least one outer tube lane is different from the lane flow rate of at least one inner tube lane, in particular by having set the lane flow rate of said outer tube lane upstream of the reformer tube inlets.

The invention is based on the insight that the temperature distribution over the reformer tubes throughout the reformer furnace can be controlled and/or improved by adjusting (increasing or decreasing) the lane flow rate of a certain tube lane. In particular good results were obtained by adjusting the lane flow rate of one or both of the outer tube lanes, such that they have a different lane flow rate compared to at least one inner tube lane.

According to the invention, the lane flow rate of one tube lane is set to be different from the tube lane flow rate of another lane. This can be achieved by controlling or setting the flow rate upstream of the reformer tubes of said certain lane, e.g. in the gas header that provides the tube lane with process gas. In this way, the flow rate of an entire tube lane can be easily adjusted. As a result, the spread in the average temperature differences between the lanes is reduced. It was found that such adjustment in lane flow rate of different tube lanes (including the outer tube lanes) is a relative easy way to improve and/or control the temperature distribution throughout the reformer.

It was found that by controlling the average tube temperature of the outer tube lanes, and possibly also of the second tube lanes, the spread in lane average tube temperature observed between tube lanes throughout the furnace could be reduced. Furthermore, such a method allows for controlling the average tube temperature spread between lanes even during operation of the reformer/furnace (also called in operando control). Unlike with most methods for improving the heat distribution in a furnace, it is not necessary to shut down the furnace.

Basically, the process gas acts as a cooling fluid in the reformer chamber, transporting the heat away from the reformer chamber. In reformers known in the art, each tube lane has the same lane flow rate. However, by setting the lane flow rate of certain tube lanes to have a different value, in particular one or both of the outer tube lanes, the temperature spread in a reformer can be decreased. Accordingly, a more uniform temperature distribution in the reformer is achieved.

In case a certain lane has a too high temperature relative to the rest of the reformer chamber, the flow rate of the process gas in that lane can be increased, such that the temperature of the lane drops. Alternatively, in case a certain lane has a temperature that is too low relative to the rest of the reformer chamber, the flow rate of the process gas in that lane can be decreased. Thus, the temperature distribution can be made more uniform by choosing a flow rate for at least one of the outer tube lanes that is different (viz. higher in case the temperature of the outer lane is relatively high; lower in case the temperature of the outer lane is relatively low) compared to the flow rate of the process gas in the inner lanes.

The lane flow rate of a certain lane is defined herein as the rate at which the process gas flows through the reformer tubes of that lane. The rate is expressed as the amount of process gas per unit time. The amount of process gas typically refers to the total mass of the process gas, in which case the flow rate thus refers to the mass flow rate. The flow rate of a certain lane is equal to the sum of the flow rates of all individual reformer tubes present in the lane:

$$F_{lane} = \Sigma_{1-n}(F_{tube1} + F_{tube2} + F_{tube3} + \ldots + F_{tuben}) \quad (1)$$

wherein $F_{lane}$ is the lane flow rate of a certain lane, $F_{tube1}$ is the flow rate in the first reformer tube of said certain lane, $F_{tube2}$ is the flow rate in the second reformer tube said certain lane and n is the amount of reformer tubes present in the lane.

The term "flow rate" as used herein typically refers to the mass flow rate.

The term "at least one outer tube lane" as used herein both includes embodiments wherein the term means "one outer tube lane" and wherein the term means "any of the two outer tube lanes".

The term "at least one inner tube lane" as used herein includes embodiments wherein the term means "any of the third and further inner tube lanes", "any of the fourth and further inner tube lanes" and "any of the inner tube lanes".

When referring herein to the temperature of a tube, in particular the temperature of the tube wall is meant. Since the tube wall is typically made of metal, one may also refer to this temperature as the tube metal temperature. Furthermore, when referring herein to the temperature of a tube lane, in particular the average temperature of the tubes present in the lane is meant. The temperature of a tube or tube wall can be measured using techniques known in the art, for example using Spot Infrared Pyrometer or Thermal Imagery. Typically, the temperature of a tube differs over the length of a reformer tube (e.g. the tube is hottest at the end of the tube, where the process gas leaves the reformer chamber). When measuring the temperature of different reformer tubes (or lanes), the temperature is typically measured at the same elevation, i.e. at the same height in the reformer chamber. Accordingly, the temperature of each tube can be measured at the same distance from the closest burner row. However, even at the same height, the temperature may be different depending on which side of the tube the temperature is determined. Accordingly, when measuring the temperature of different reformer tubes (or lanes), the temperature is also typically measured at the same side, more specifically at the same exposure angle toward the nearest burner row. Thus, temperatures of different tubes and lanes can be compared and/or averaged if needed. The temperature at the end of a tube may also be determined by measuring the temperature of the process gas when it exits the reformer tube. This is a more practical and easy way of determining the temperature of a tube or tube lane, because no temperature measurements inside the reformer chamber need to be conducted in this way.

The terms "temperature distribution" and "temperature spread" as used herein relate to the distribution and spread of the temperature over the tubes or tube lanes. The temperature distribution and spread over the tubes or tube lanes may be assessed by measuring and comparing the temperature of each reformer tube or tube lane, preferably at the same elevation and exposure angle as explained above.

A top or bottom fired reformer is a furnace that is well known in the art. Such a furnace comprises a reformer chamber with generally four side walls, a top and a bottom. A top or bottom fired reformer has alternating lanes of burners and reformer tubes. A lane of burners may herein also be referred to as a burner lane. A lane of reformer tubes may herein also be referred to as a tube lane. A tube lane is a lane of multiple reformer tubes, which are essentially parallel to each other. The reformer tubes are positioned vertical in the reformer chamber, which means they either enter the reformer chamber through the top facing downward (towards to the bottom of the reformer chamber) or they enter the reformer chamber through the bottom facing upward (towards the top of the reformer chamber). The tube lanes lie essentially parallel to each other, as well as to two of the side walls of the reformer chamber. These side walls are referred to as the lane side walls. The burners are essentially disposed on one plane, i.e. either in the top or in the bottom of the reformer chamber. The burners are disposed in lanes, which lanes are essentially parallel to the tube lanes and lane side walls. The burner lane that lies nearest to a lane side wall (compared to all other burner lanes) is referred to as a side burner lane. The other burner lanes may be referred to as center burner lanes. A tube lane that lies nearest to a lane side wall (compared to all other tube lanes) is referred to as an outer tube lane. The other tube lanes may be referred to as inner tube lanes. Since there are two lane side walls in a reformer chamber, there are two outer tube lanes and two side burner lanes. Most commercial top or bottom fired reformers comprise 2-16 tube lanes, but the invention may also work for larger amounts of tube lanes. The present invention is particular advantageous for larger reformers with more than 4 tube lanes.

The different burner lanes and tube lanes may be referred to as follows. A side burner lane may be referred to as a first burner lanes (B1); a burner lane adjacent to a side burner lane may be referred as a second burner lane (B2); a burner lane adjacent to a second burner lane (and not being a first burner lane) may be referred to as a third burner lane (B3), etc. An outer burner lanes may be referred to as a first tube lane (O or T1); a tube lane adjacent to an outer tube lane may be referred as a second tube lane (T2); a tube lane adjacent to a second tube lane (and not being a first tube lane) may be referred to as a third tube lane (T3), etc. Accordingly, a lane configuration comprising five tube lanes (two outer lanes and five inner lanes) and six burner lanes can be represented as follows: |B1-O-B2-T2-B3-T3-B3-T2-B2-T1-

B1-, wherein the lane side wall is represented by "|". The one or two tube lanes of the highest number (in the previous example T3) may be referred to as the most inner tube lane(s).

According to the invention, the flow rate of at least one outer lane is different from the flow rate of at least one inner lane. In principle, setting the flow rate of one outer lane to be different from at least one inner lane is sufficient to improve the temperature distribution over the reformer (albeit only at one side of the reformer chamber). However, preferably, the flow rate of both outer lanes is adjusted in this way, such that the temperature spread is improved at both sides of the reformer chamber.

The lane flow rate of the least one outer lane may be higher or lower than the lane flow rate of the at least one inner lane. This mainly depends on the duty of the burners. In case the duty of the burners is relatively high, the lane flow rate of the outer lane will generally be higher than the lane flow rate of the at least one inner lane. In case the duty of the burners is relatively low, the lane flow rate of the inner lane will generally be lower than the lane flow rate of the at least one inner lane.

Generally, there is not much difference between the flow rates of the two outer tube lanes. The difference is usually minimized by designing accurately the allowable pressure drop of the tubes that convey the process gas from the main gas header to the individual tube lanes. The difference in lane flow rate between the two outer tube lanes may be less than 1%, preferably less than 0.5%, even more preferably less than 0.1%, based on the outer lane with the lowest lane flow rate. Generally, the flow rate of the two outer tube lanes is generally about the same.

According to the method of the invention, the lane flow rate of a certain tube lane (e.g. the at least one outer tube lane and optionally one or more inner tube lanes) is different from the lane flow rate of at least one inner tube lane. This is done by setting the lane flow rate of a certain tube lane (e.g. the at least one outer lane or one or more inner tube lanes) to a value different from at least one inner lane. This can be established by adjusting the flow rate of the process gas upstream of the reformer tubes of said certain tube lane, for example in the gas header or even further upstream, in the gas distributor. In this way, the lane flow rate of a tube lane can be set using only a few (e.g. one or two) flow regulators. Also, this makes it possible to set the lane flow rate outside the firebox of the reformer, such that it is not necessary to shut down the reformer when setting the lane flow rate. It is in principle also possible to set the flow rate of a single reformer tube (e.g. by providing the inlet of the reformer tube with an insert or plate to partially stop or obstructs the flow of the process gas), but this is less preferred due to the large number of catalyst tubes in a reformer, as well as the fact that such an operation would require shutdown of the furnace. Therefore, the lane flow rate of a tube lane is generally set upstream of the reformer tube inlet, typically at the gas header.

In order to provide a certain tube lane with a lane flow rate of a certain value (e.g. a flow rate that is different from the lane flow rate of at least one of the inner tube lanes), the flow rate at which the gas header of said certain tube lane provides the reformer tubes in said lane with process gas can be set, adjusted and/or controlled. For example, the flow rate at which the gas header of said certain tube lane is provided with process gas can be set, adjusted and/or controlled. Thus, indirectly, the lane flow rate of the tube lane is set. For example, the outer lane can be provided with a lane flow rate that is different from the lane flow rate of the at least one inner tube by adjusting the flow rate of the process gas upstream of the reformer tubes of said outer lane.

Setting the lane flow rate of a certain tube lane is generally done by controlling or setting the flow rate at the gas header, e.g. the flow rate at which process gas enters the gas header of that lane, i.e. the gas header that provides that tube lane with process gas. Typically, each tube lane in a reformer comprises a gas header for distributing the process gas over the reformer tubes in said tube lane. A gas header is typically a tube comprising one or more inlets and multiple outlets. The tube may be linear or branched may have a fixed or variable internal diameter. The gas header can be roughly divided in two parts: a lane part and a connector part. The lane part of the gas header is the elongated portion of the gas header that comprises the gas header outlets. The lane part typically lies about parallel to a tube lane. The connector part of the gas header is the portion of the gas header connecting the lane part and the gas distributor. Thus, the connector part is the part of the gas header that provides the process gas to the lane part of the gas header. Preferably, the one or more flow regulators are placed in the gas header, for example in the connector part of the gas header. When placed in a gas header, the flow regulator should preferably be placed upstream of all reformer tube inlets, in particular upstream of all gas header outlets of said gas header. Most preferably, not one gas header outlet is located upstream of a flow regulator.

Figure 1:
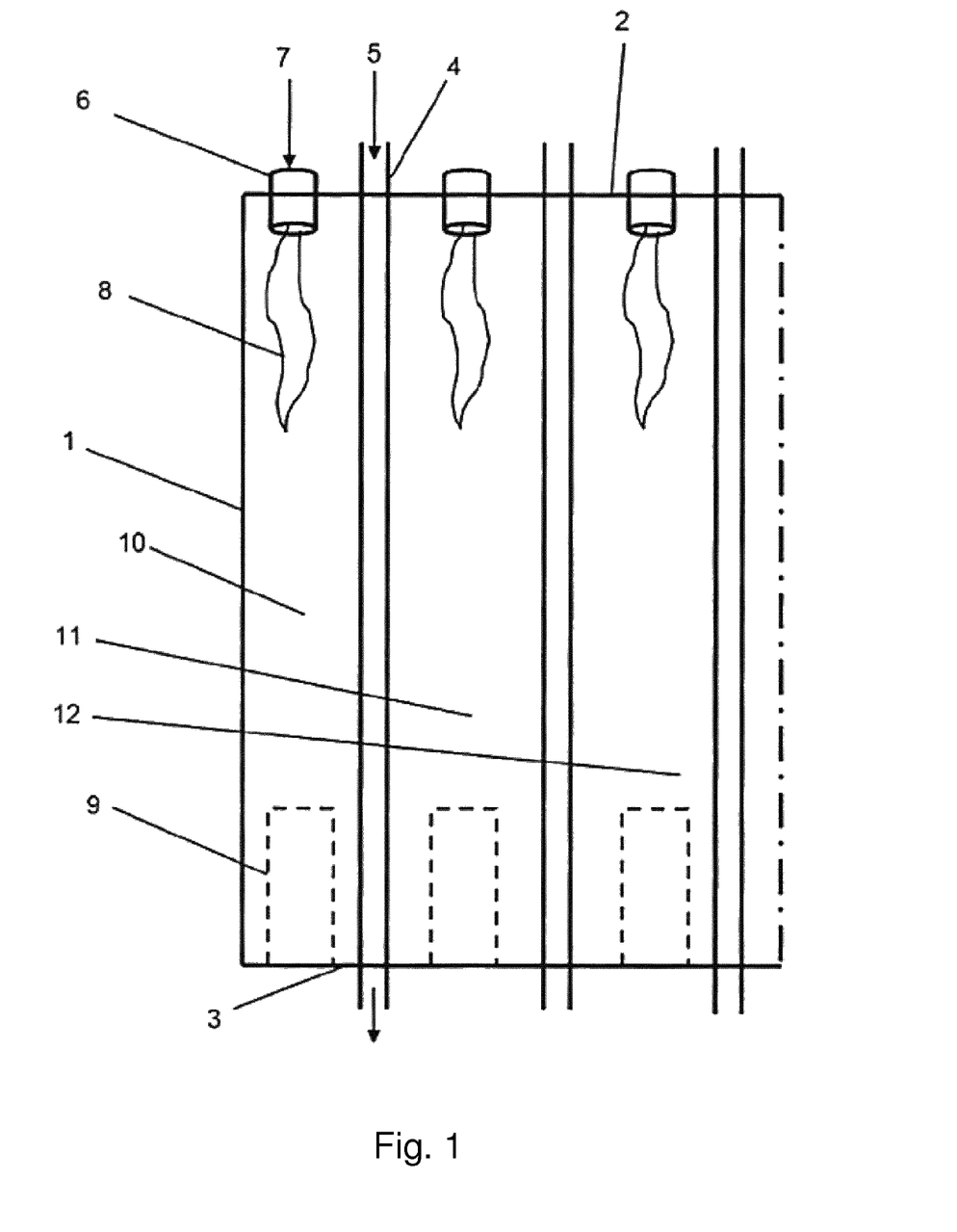
FIG. 1 depicts a side view of a top fired reformer showing a side burner lane and an outer tube lane and additional alternating center burner lanes and inner tube lanes. For each lane, only one tube or burner is shown.
Figure 2:
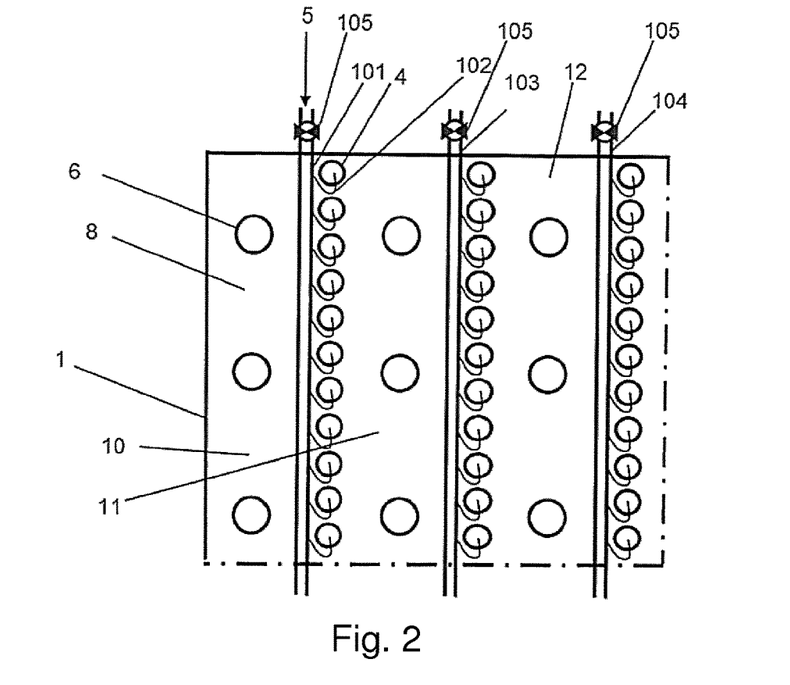
FIG. 2 depicts a top view of the same top fired reformer showing two side walls, three burner lanes and three tube lanes. Each tube lane has a gas header with a flow regulator provided to it. The figure does not depict the entire reformer. The furnace may have one or more tube lanes, burner lanes, tubes per lane and burners per lane that are not depicted in the Figure.
Figure 3:
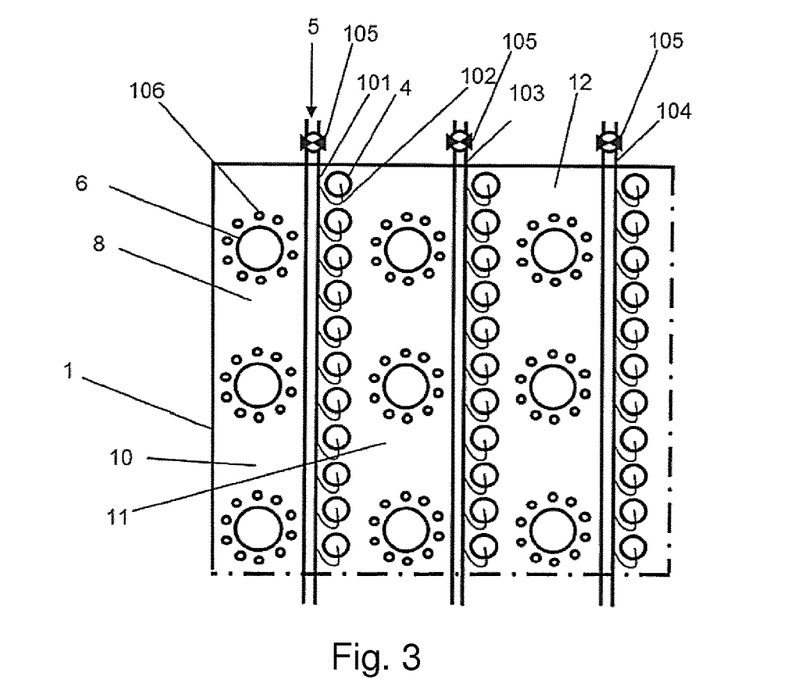
FIG. 3 depicts a top view of the same top fired reformer showing two side walls, three burner lanes and three tube lanes, as well as multiple fuel injectors 106 surrounding each burner. Each tube lane has a gas header with a flow regulator provided to it. The figure does not depict the entire reformer. The furnace may have one or more tube lanes, burner lanes, tubes per lane and burners per lane that are not depicted in the Figure.
Figure 4:
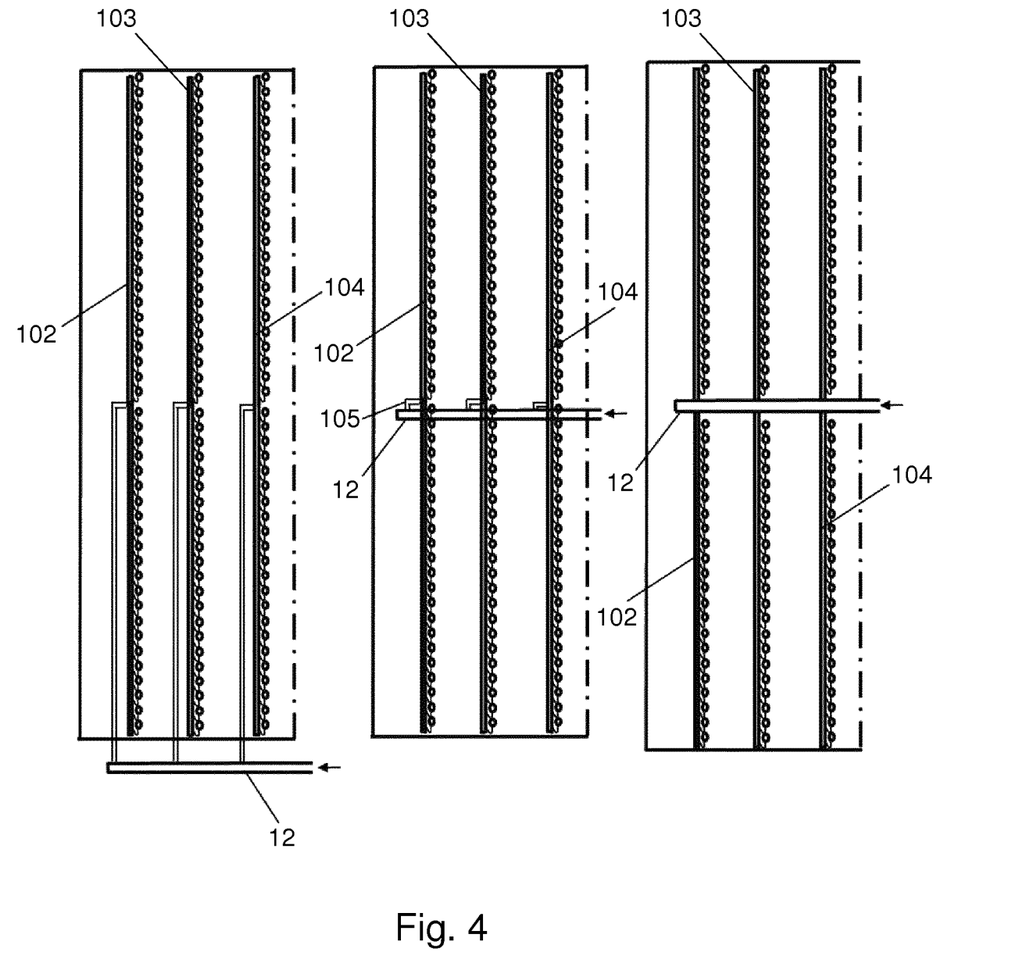
FIG. 4 depicts three top views of a top fired reformer, showing three different configurations for positioning the gas header and gas distributor. The top views each show three gas headers (102, 103, 104) and one gas distributor (12).
Figure 10:
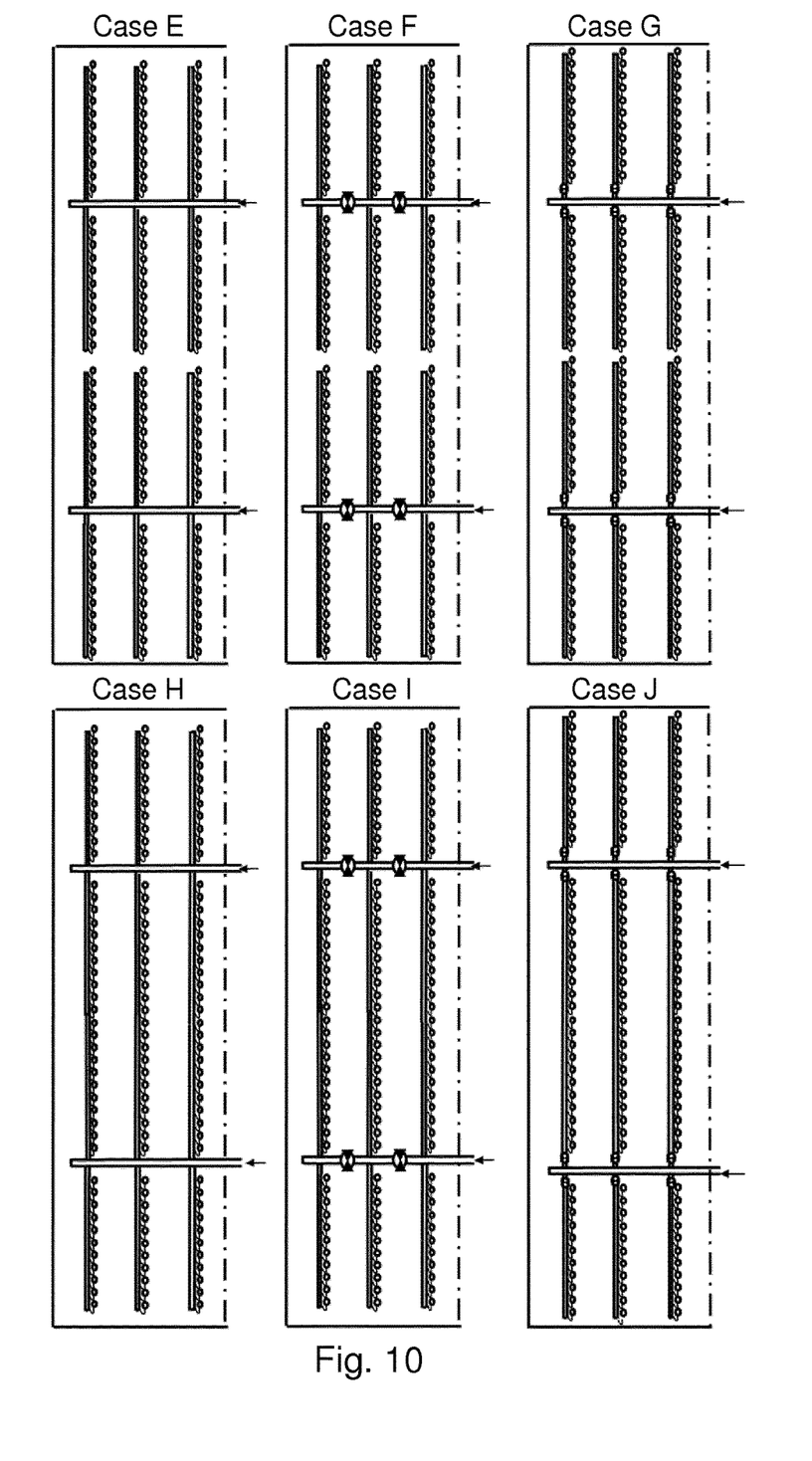
FIG. 10 shows different possible configurations of headers and gas distributors.

The gas header configuration may be of different complexity degree. In reality the design is generally the compromise between a desired homogeneity in the distribution of the fluid and the amount of pipes and welding work to be done to obtain the corresponding design. For instance a gas header system may comprise a gas distributor (main header) which distributes the fluid to gas headers (sub headers). The use of gas distributor and gas header design allows some flexibility for selecting the most suitable routing for the piping and thus the best compromise between distribution performance and piping cost. Different configurations are shown in FIGS. 4 and 10.

A gas header has at least one inlet for process gas to enter the gas header and multiple outlets for process gas to exit the gas header and be fed to the reformer tubes of the tube lane (i.e. the tube lane comprising the gas header). Each reformer tube of the tube lane is fluidly connected to at least one of the outlets of the gas header. Generally, one reformer tube is only connected to one of the multiple outlets of the gas header. Typically, a gas header only has one inlet. Typically, the number of outlets in the gas headers equals the number of reformer tubes in the lane. The at least one inlet of the gas header may be fluidly connected to a process gas reservoir, to a feed of process gas or to at least one outlet of the gas distributor described below. The gas header is typically located just outside the radiant section of the furnace, i.e. outside the reformer chamber. Nevertheless, the process gas flowing through the gas header in a reformer still has a high temperature of up to 700° C. Such high temperatures are necessary for the catalyst to be already significantly active when the process gas enters the reformer tubes. For this purpose, the process gas is typically pre-heated to temperatures of 500-600° C. before it is fed to the gas header.

Thus, to set the flow rate of a certain tube lane, the gas header of said tube lane may be provided with a process gas at a flow rate, such that said tube lane has a lane flow rate different from at least one inner lane. Accordingly, in case of the at least one outer tube lane, the gas header of the outer tube lane may be provided with a process gas at a flow rate such that the at least one outer lane has a lane flow rate different from the at least one inner lane.

As already explained above, it is difficult to predict the exact heat release of the side burner lane and how it evolves with time and feed composition changes. Therefore, it is desirable that the flow rate can be set to a certain value, and if necessary, can be adjusted later. In this way, it is possible to provide certain lanes with an initial lane flow rate, subsequently measuring the temperature distribution that is obtained with the initial configuration, and then adjust the initial flow rates of one or more of the lanes to reduce the temperature spread further compared to the initial configuration. In this way, by adjusting and/or re-adjusting the flow rate of different tube lanes, the temperature distribution over the reformer can be controlled and improved.

Accordingly, in order to be able to set (and if necessary further adjust, e.g. by re-setting) the flow rate at which process gas is provided to the gas header of a certain lane, a flow regulator may be used (also called a flow control device). A flow regulator allows for setting and/or varying the flow rate at which process gas is provided to the gas header of a certain lane. For example, the flow regulator may allow for providing a gas header of a certain lane with process gas at a flow rate between 90-110%, preferably between 95 and 105% of the flow rate with which the gas header of one or more of the inner tube lanes is provided. Suitable examples of flow regulators are inserts, valves, plates (e.g. orifice plates or restriction orifices) and venturi nozzles. If necessary, different gas headers may be specifically designed in order to be able to supply the tube lanes with the desired flow rates. For example, in case the gas header that provides the outer tube lane with process gas needs to provide the gas at a higher flow rate, the gas header may need to have a larger diameter than the gas headers of the inner lanes.

The one or more flow regulators in the reformer may be controlled manually or automatically. They may be controlled on site or remotely. The decision whether to adjust a flow regulator may be based on the temperature of the process gas leaving a certain tube lane. This is done for practical reasons, as temperature measurement can be suitably located in the outlet system of a tube lane. Accordingly, the temperature of the different tube lanes can be increased or decreased via an accurate control.

The temperature spread over the reformer tubes can be expressed by comparing the difference in temperature between the process gas leaving the different reformer tube lanes. Such a temperature measurement is most practical, as it can be located in the outlet system of the reformer.

Preferably, the temperature difference between the process gas exiting any of the tube lanes is less than 10° C., even more preferably less than 5° C.

The flow regulator may be provided to the gas header of the tube lane for which the lane flow rate needs to be set, for example by attaching it to a gas header inlet thereof. Each tube lane for which the flow rate needs to be set or varied may have a gas header provided with a flow regulator. Accordingly, the gas header inlet of the at least one outer tube lane will generally be provided with a flow regulator. The flow regulator determines the flow rate at which process gas is provided to the gas header. In principle, the flow regulator may be provided at any suitable position upstream of the reformer tubes. Typically, the flow regulator is provided to the inlet of the gas header. A flow regulator may for example be inserted into or physically attached to the at least one gas header inlet. For example, the gas header inlet may comprise a port into which the flow regulator (e.g. a valve or inlet) can be screwed or fitted. Such a port may be welded or flanged into the inlet line of the gas header.

Alternatively, the flow regulator may be provided upstream of the gas header inlet. The flow regulator may for example be provided to a gas distributor or to a tube that provides process gas to the gas header of the tube lane for which the lane flow rate needs to be set (e.g. to the gas header of the at least one outer tube lane). In this case, the flow regulator is fluidly connected to the inlet of the gas header of the tube lane for which the lane flow rate needs to be set. For example, the flow regulator may be fluidly connected to the inlet of the gas header via a gas distributor or via a tube for providing the gas header with process gas. The flow regulator may be provided in the tube or to the tube's inlet.

The flow regulator may partially block or obstruct the flow of process gas provided to the gas header. Thus, the flow regulator manages to change the flow rate. The flow regulator may work by creating a pressure drop between the gas header and the tube, process gas reservoir or gas distributor through which the gas header is provided with process gas. As mentioned above, examples of flow regulators are inserts, valves, plates (e.g. orifice plates or restriction orifices) and Venturi nozzles. Plates and inserts may simply block part of the passageway of the process gas. An insert may be inserted into a tube (e.g. the tube providing a gas header with process gas) or into an inlet (e.g. a gas header inlet). Inserts may have a specific geometry that can be designed for generating a given pressure drop (and thus a given flow rate).

Preferably, the flow regulator is (highly) resistant to high temperatures. In this aspect, inserts are more desirable than valves (e.g. due to the moving parts in a valve). The temperature in the gas header is generally higher than the typical maximum temperature that control valves and safety valves can endure.

Preferably, the flow regulator is adjustable. This means that the flow rate at which a gas header is provided with process gas can be set to a different value without having to remove the flow regulator from the reformer (typically from the gas header thereof). Valves can be easily set to provide a different flow rate. An example of a suitable valve is a butterfly valve. A disadvantage of a valve however is that it does not have a high temperature resistance due to its moving parts. Nevertheless, it can still be suitably used in the invention to create a pressure drop, especially when one does not intend to close the valve tightly.

In case the flow regulator is not adjustable (for example for certain inserts and plates), the flow rate can be set by exchanging the flow regulator. This means that the flow regulator is removed and replaced with a different flow regulator. Accordingly, the insert or plate is preferably removably attached to the gas header or to the tube providing the gas header with process gas. Removable means that the flow regulator can be attached and removed again without damaging the equipment and preferably also without damaging the flow regulator itself. In order to easily set the flow rate using an insert, the insert should be removable and preferably also accessible. In a preferred embodiment, the flow regulator is an insert. Inserts can be designed such that they can easily be accessible and be exchangeable.

The flow rate at which the process gas is provided to a gas header may also be set or controlled by a gas distributor. Typically, all gas headers are filled with process gas from the same process gas reservoir and/or from the same main process gas feed stream. Reforming is generally carried out on a single process gas composition for all the reformer tubes. In such a case, one reservoir (e.g. buffer tank or pipe) provides all reformer tubes with process gas, which reservoir is located outside the reformer or even outside the reforming facility. This may be achieved by using a further gas header for distributing the gas headers of the tube lanes with process gas.

Such a further gas header is referred to herein as the gas distributor. Such a gas distributor may also be referred to as a main header, with the gas headers downstream of this header then being referred to as subheaders. The process gas generally enters the gas distributor at one certain flow rate. The process gas may distribute the process gas to each gas header at the same flow rate. However, the gas distributor may also be designed such that it can provide the gas headers of one or more lanes with a different flow rate. This can for example be achieved by providing the above-mentioned flow regulators to one or more of the gas distributor outlets (instead of to the gas header).

The gas distributor comprises at least one inlet for process gas to enter the gas distributor; and multiple outlets for process gas to exit the gas distributor and be fed to the gas headers. Each gas header inlet is fluidly connected to one of the multiple outlets of the gas distributor. Accordingly, the gas header may herein also be referred to as the gas subheader (with the gas distributor being the main gas header). Generally, one gas (sub)header inlet is connected to one of the multiple outlets. Thus, the number of outlets in the gas distributor equals the number of gas headers (and thus also the number of tube lanes). The gas distributor outlets may be connected to gas headers at the end portion or at any other location along the length of the gas header. The at least one inlet of the gas distributor may be fluidly connected to a process gas reservoir or to a main feed of process gas.

As mentioned above, flow regulators may be used to set (and if necessary further adjust, e.g. by re-setting) the flow rate at which the process gas is provided to the gas header of a certain lane. The lane flow rate of a certain tube lane can be set by providing the gas distributor outlet that is fluidly connected to the gas header inlet of said certain tube lane with a flow regulator. A gas distributor outlet may be provided with a flow regulator in the same way as a gas header inlet can be provided with a flow regulator.

Below, a number of criteria is given for the difference in flow rate between the at least one outer tube lane and the at least one inner tube lane. Although the term "at least one outer tube lane" is used below, the embodiments wherein both outer tube lanes fulfill the criteria is also envisioned by the present invention and explicitly disclosed herewith. In fact, in most practical embodiments of the invention, the same criteria with respect to the difference in flow rate with the at least inner tube lane generally apply for both outer tube lanes.

The at least one outer tube lane generally has a lane flow rate that is different from any of the second tube lanes, and preferably also different from any of the fourth and further tube lanes, more preferably different from any of the third and further tube lanes, even more preferably different from any of the inner tube lanes.

The at least one outer tube lane generally has a lane flow rate that is 90-110% of the lane flow rate of at least one inner tube lane, preferably of any of the inner tube lanes.

In case the flow rate of the at least one outer tube lane should be lower than that of one or more of the inner tube lanes, the at least one outer tube lane may have a lane flow rate that is 90-99%, for example 95-98%, of the lane flow rate of the inner tube lane with the highest lane flow rate. The at least one outer tube lane may further have a lane flow rate that is 90-99%, for example 95-98%, of the flow rate of any of the fourth and further inner tube lanes, or of any of the third and further inner tube lanes, or even of any of all the inner tube lanes.

In case the flow rate of the at least one outer tube lane should be higher than that of one or more of the inner tube lanes, the at least outer tube lane may have a lane flow rate that is 101-110%, for example 102-105%, of the lane flow rate of the inner tube lane with the lowest lane flow rate. The at least one outer lane may further have a lane flow rate that is 101-110%, for example 102-105%, of the flow rate of any of the fourth and further inner tube lanes, or of any of the third and further inner tube lanes, or even of any of all the inner tube lanes.

In order to decrease the temperature spread over the reformer chamber even more and/or to achieve an even more uniform temperature distribution over the reformer chamber, one or both second tube lanes may be set to have a flow rate different from one or more of the third and further inner tube lanes. As already explained above, a second tube lane is a tube lane adjacent to one outer tube lane and one further inner lane (viz. the third tube lane). Regardless of whether the lane flow rate of the one or both outer tube lanes was set to be higher or lower than the lane flow rate of one or more of the inner tube lanes, the lane flow rate of one or both second tube lanes may independently be chosen to be higher or lower than the third or further tube lanes. This will be mainly determined by the duty intensity of the burners and the lane flow rate of the at least one outer tube lane.

In case the flow rate of the at least one second tube lane should be lower than that of one or more of the other inner tube lanes, the at least one second tube lane may have a lane flow rate that is 90-99%, for example 95-98%, of the lane flow rate of the inner tube lane with the highest lane flow rate. The at least one second tube lane may further have a lane flow rate that is 90-99%, for example 95-98%, of the flow rate of any of the fourth and further inner tube lanes, or of any of the third and further inner tube lanes.

In case the flow rate of the at least one second tube lane should be higher than that of one or more of the other inner tube lanes, the at least one second tube lane may have a lane flow rate that is 101-110%, for example 102-105%, of the lane flow rate of the inner tube lane with the lowest lane flow rate. The at least one outer lane may further have a lane flow rate that is 101-110%, for example 102-105%, of the flow rate of any of the fourth and further inner tube lanes, or of any of the third and further inner tube lanes.

In order to decrease the temperature spread over the reformer chamber even more and/or to achieve an even more uniform temperature distribution over the reformer chamber, one or both third tube lanes may also be set to have a lane flow rate different than the fourth and further inner tube lanes. The same criteria for the difference described above for the second tube lane apply.

Generally, there is not much difference between the flow rates of the most inner tube lanes. The difference in lane flow rate between any two of the fourth and further tube lanes, or even between any two of the third and further tube lanes, may be less than 1%, preferably less than 0.5%, even more preferably less than 0.1%, based on the lowest lane flow rate of the two. Generally, the flow rate of the fourth and further tube lanes, or even the third and further tube lanes, is about the same. Accordingly, the flow rate of these lanes is not set to be different from the most inner tube lanes. In one embodiment, the difference in lane flow rate between any two of the inner lanes is less than 0.5%, for example less than 0.1%, based on the lowest lane flow rate of the two.

In a preferred embodiment, the present invention may be combined with the teaching of US 2011/0220847, which application is included herein by reference. Accordingly, the side burners (i.e. the burners located adjacent to a side wall of the reformer chamber), may have one or more injection properties different from the center burners (i.e. the burners that are not located adjacent to a wall of the reformer chamber). The one or more injection properties are selected from the group consisting of the angle of the oxidant injector, the angle of the fuel injector, the flow rate at which the oxidant leaves the oxidant injector, the flow rate at which the fuel leaves the fuel injector, the amount of oxidant injectors, the location of the oxidant injectors, the amount of fuel injectors and the location of the fuel injectors. In this way, the temperature spread that may especially occur at the corners of the reformer chamber may be further decreased. Accordingly, especially the four burners in the corners of the top or bottom of the reformer chamber may be adjusted have different injection properties from the center burners. Furthermore, fuel to oxidant ratio may be chosen differently in the burners adjacent to a refractory wall (especially the four corner burners) and the center burners.

The invention is further directed to a top or bottom fired reformer wherein the methods of the invention may be conducted. Thus, the invention is directed to a top or bottom fired reformer which may be used for heating a process gas and/or for improving the temperature distribution in the reformer, which reformer comprises:

a reformer chamber comprising alternating lanes of burners and reformer tubes;

at least three lanes of reformer tubes, wherein each lane comprises a) multiple reformer tubes and b) a gas header for distributing process gas over the reformer tubes, wherein the gas header has at least one inlet for process gas to enter the gas header and multiple outlets for process gas to exit the gas header and to be fed to the reformer tubes, wherein each of the multiple reformer tubes of a certain lane is fluidly connected to at least one of the outlets of the gas header of that same lane, wherein said at least three lanes comprise two outer lanes and at least one inner lane; and at least two lanes of burners located at the top or bottom of the reformer chamber wherein each lane of burners is positioned in between two lanes of reformer tubes or in between an outer lane of reformer tubes and a side wall of the reformer chamber; and optionally a gas distributor for distributing process gas to the gas headers, which gas distributor has at least one inlet for process gas to enter and multiple outlets for process gas to exit and to provide process gas to the gas headers, wherein each gas header inlet is fluidly connected to one of the multiple outlets of the gas distributor; and a flow regulator for setting the flow rate at which process gas is provided to the gas header of one of the outer lanes, such that process gas is provided to the gas header of said one of the outer lanes at a flow rate different from the gas header of at least one inner lane; and optionally one or more additional flow regulators for setting the flow rate at which process gas is provided to the gas header of other lanes than said one of the outer lanes.

The flow regulator may be connected to the reformer as described above.

As explained above, one or more flow regulators may be present in the reformer. Typically, the gas headers of both outer tube lanes are provided with a flow regulator (either to the gas header inlet, or upstream of the gas header). Also, the gas headers of the second tube lanes are preferably provided with a flow regulator (either to the gas header inlet, or upstream of the gas header).

The basic configuration of a top or bottom fired reformer is also described above. This configuration also applies to reformer of the invention. Furthermore, the description of the gas header(s), gas distributor and/or flow regulators described above for the methods of the invention also applies to the reformer of the invention.

An important improvement of the invention is the simplicity of the system and the ease of control and operability for the operators of the reformer. An improved temperature spread over the furnace allows a tighter control of the temperature to which the furnace materials (e.g. tubes, inlet and outlet system) are exposed to during their lifetime. Therefore a cost saving can be achieved by increasing the overall lifetime of the reformer.

The implementation of the invention is relatively easy and requires low maintenance and operation costs, as opposed to the balancing of individual burners which requires iterative tube temperature measurement and lengthy adjustment of each burners in a warm environment.

EXAMPLE 1

A conventional state of the art reformer with 8 tube lanes is designed. Assuming that the two outer tube lanes will be colder by 15° C. compared to the inner lanes, the temperature of the process gas exiting the various lanes could be as follows:

| | outer lane | $2^{nd}$ lane | $3^{rd}$ lane | $4^{th}$ lane | $4^{th}$ lane | $3^{rd}$ lane | $2^{nd}$ lane | outer lane | average |
|---|---|---|---|---|---|---|---|---|---|
| Temperature | 870 | 880 | 885 | 885 | 885 | 885 | 880 | 870 | 880 |

Since the outlet temperature is controlled at 880° C. and the design temperature of the hottest tube is set based on historical data and hence is linked to the process gas outlet temperature of the inner lanes, the design temperature would actually be set based on an outlet temperature of 885° C.

By applying the present invention, the lane flow rate of the outer lanes—and possibly the 2nd tube lanes as well—can be set differently than the most inner lanes, thereby increasing the temperature of these lanes to 880° C. As a result, the hottest tube outlet temperature (average of lane) can be reduced by 5° C., hence the catalyst tube design temperature can be reduced by 5° C. resulting in significant reduction in tube wall thickness. The material cost of the reformer can therefore be significantly reduced.

EXAMPLE 2

Figure 5:
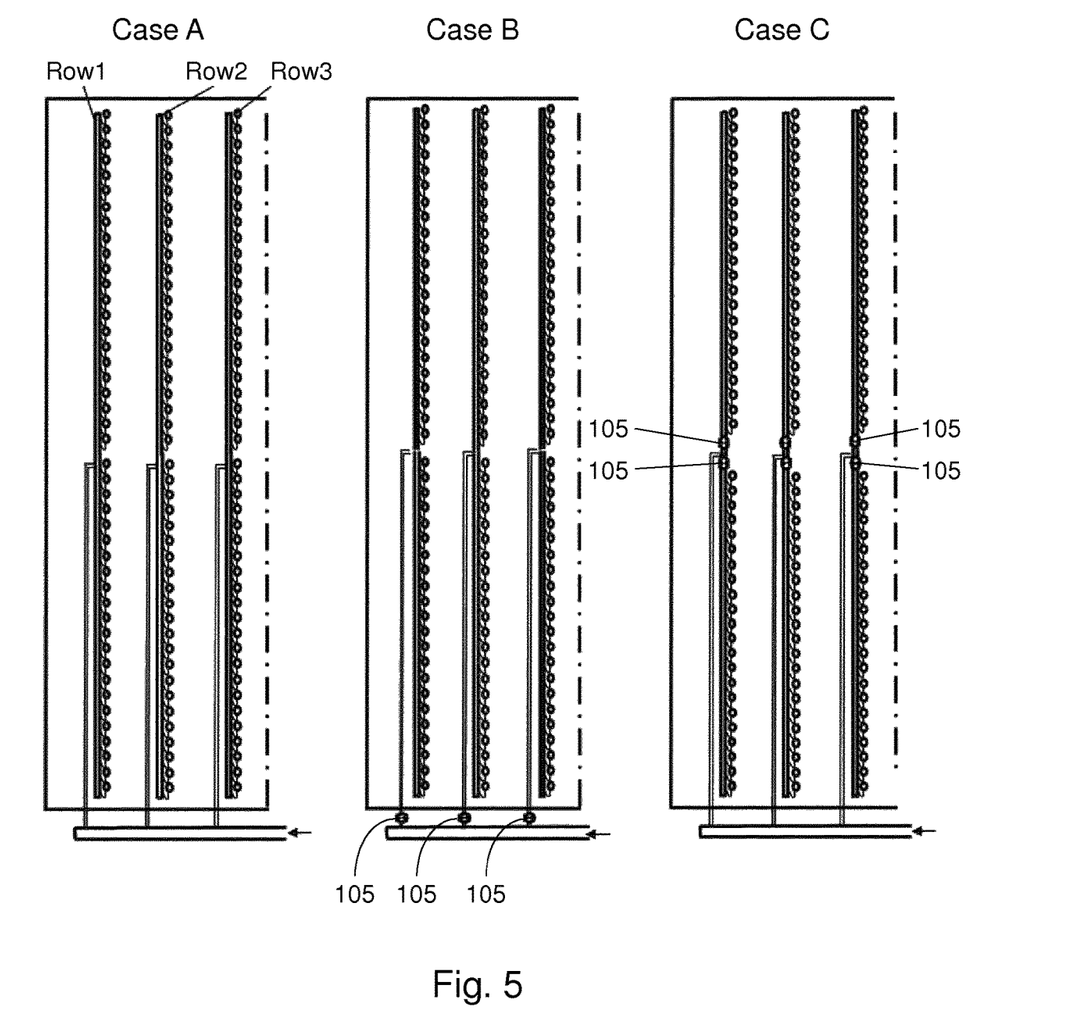
FIG. 5 depicts the same top fired reformers as FIG. 4, except that flow regulators (105) have been positioned to set the lane flow rate. In the configuration depicted on the left of the figure, no flow regulators are present. In the configuration depicted in the middle of the figure (Case B), each gas header is provided with a flow regulator downstream and outside of the gas distributor (105). In the configuration on the right (Case C), each gas header is provided with two flow regulators near the tube lane (105).

In this example, the gas header configuration as depicted in FIGS. 4 and 5 (cases A-C) was used to illustrate the invention and was compared to a reformer furnace wherein 50% of the tubes identified as the coldest tubes in case A were equipped with a flow regulator, i.e. an orifice or a valve as taught by EP2671634 (Case D).

The tube metal temperature of a furnace with multiple tube lanes were worked out for case A (FIG. 5, left). The number of tubes per lane was 44 and the design was such that a central gas distributor supplied the gaseous feed to individual gas headers for each tube row, thus providing the reforming tubes of a tube lane with process gas.

The tube lane next to the side wall is noted as row 1 (outer tube lane), the next tube lane toward the center of the reformer is row 2 and the tube lane that is on the right hand-side of the figure is noted as row 3.

In the case A no control device were in place neither in the gas inlet header system, nor in the tubes. In case B, 2 valves were placed in the gas header allowing for controlling the flow distributed to row 3, 2 and 1 independently. In case C, for each gas header, half of the lane part of the gas header was equipped with a single flow regulator, thus allowing for controlling the flow in the individual gas headers of all tube lanes.

Finally for a comparative example (case D), 50% of the tubes identified as the coldest tubes in case A, were equipped with a flow regulator, i.e. an orifice or a valve as taught by EP2671634.

Figure 6:
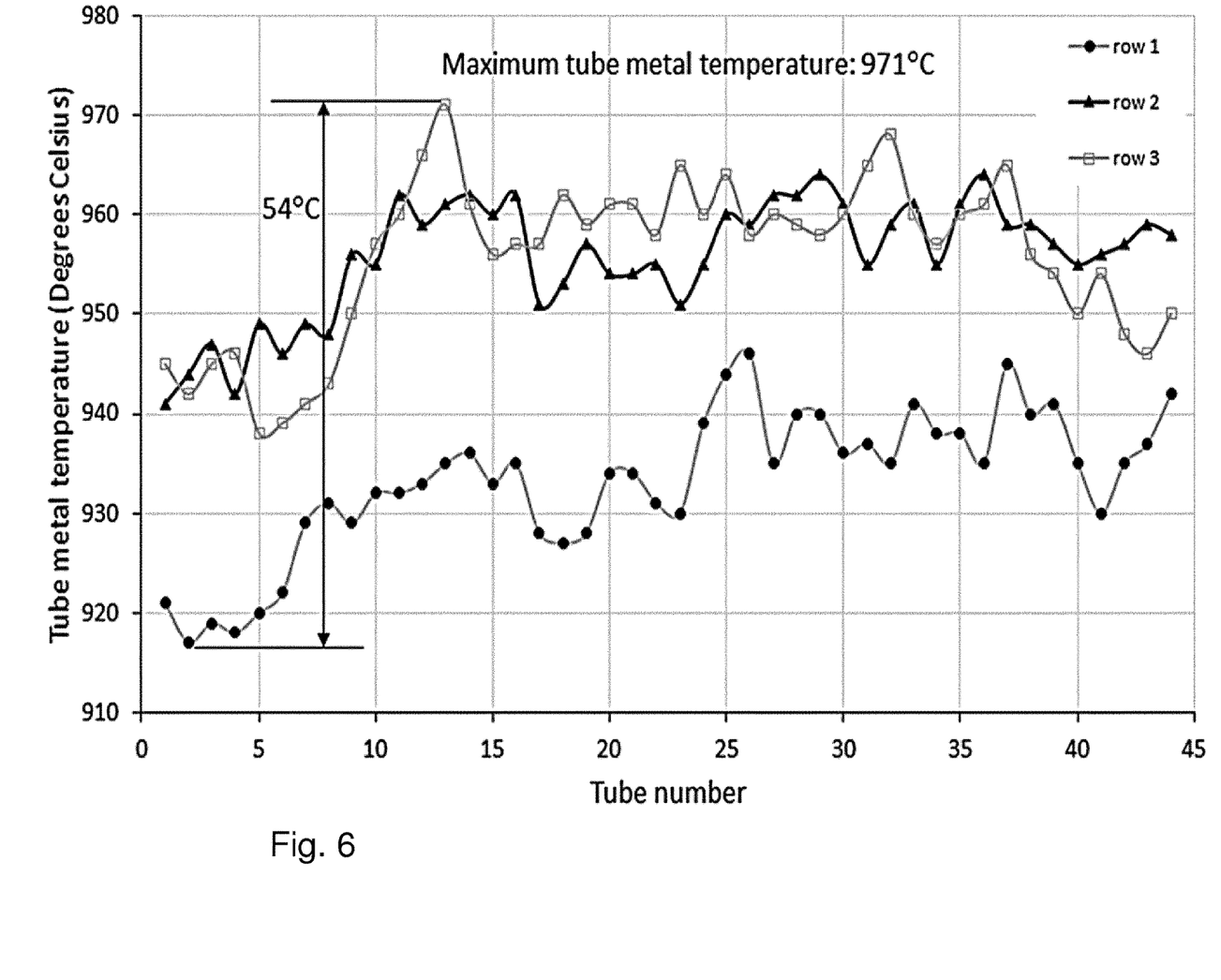
FIG. 6 is a graph showing the tube metal temperature in a reformer furnace without flow regulators.

The tube metal temperatures for case A are plotted in the FIG. 6. One can clearly recognize that the coldest tube lane is the closest to the side wall of the reformer, noted as row 1. The notable difference between the average tube metal temperature of row 1 and rows 2 and 3 may be a result of the use of relatively low absorbed duty in the outer lane compared to the center lanes.

The maximum spread observed in tube metal temperatures at the level where it is measured is about 54° C., with a maximum tube temperature value of 971° C.

Figure 7:
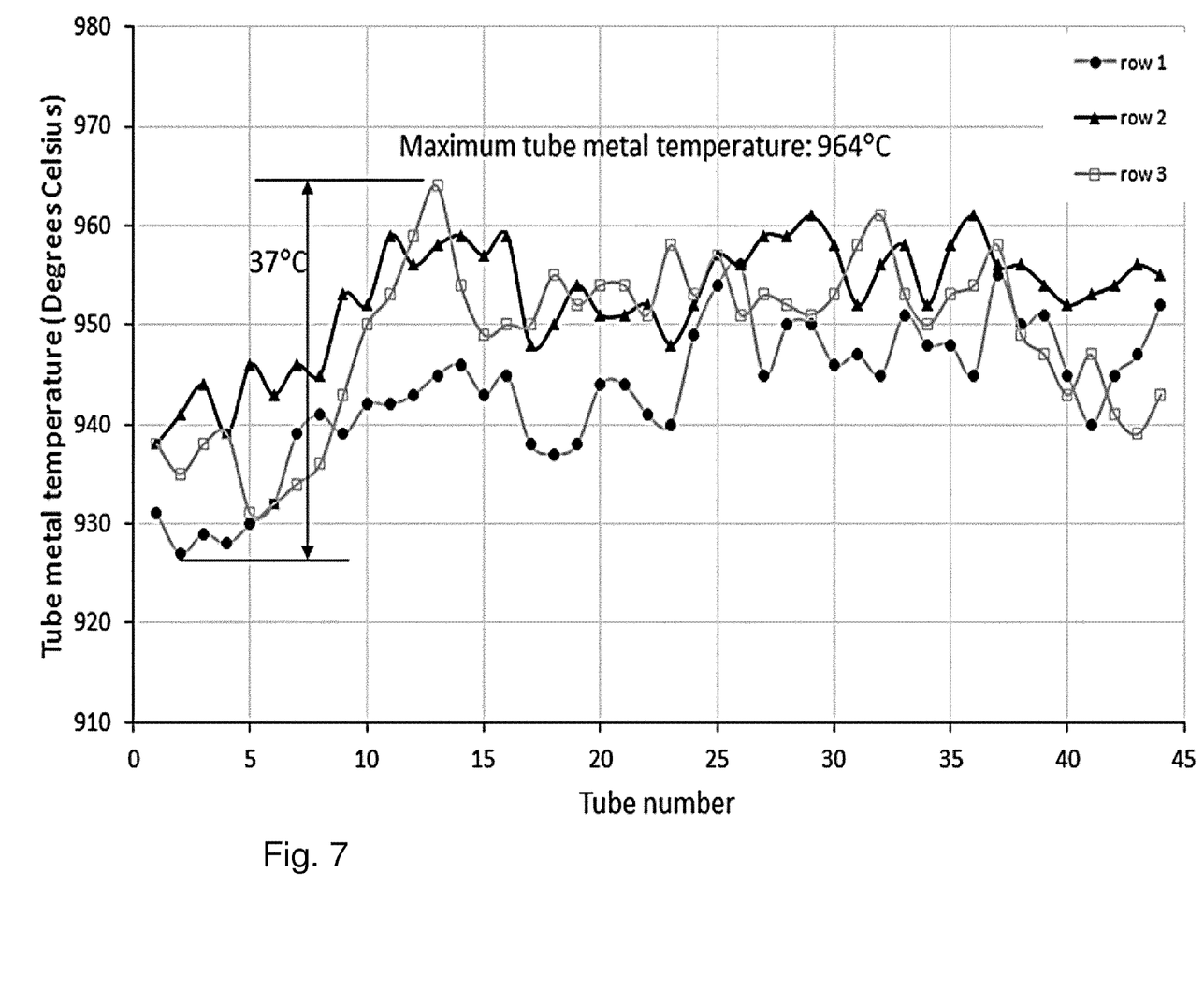
FIG. 7 is a graph showing the tube metal temperature in a reformer furnace with flow regulators positioned as in the middle top view of FIG. 5.

The tube metal temperatures for case B are plotted in the FIG. 7. The flow rate to the gas header of the outer tube lane (row 1) was reduced by the flow regulator and as consequence the tube wall temperatures increased. The outer lane still shows slightly colder temperature on average (943° C.) compared to the other lanes (953° C. for row 2 and 949° C. for row 3). The maximum spread observed in tube metal temperatures at the level where it is measured is decreased to 37° C. compared to case A, with a maximum tube temperature value of 964° C., decreased by 7° C. compared to case A.

Figure 8:
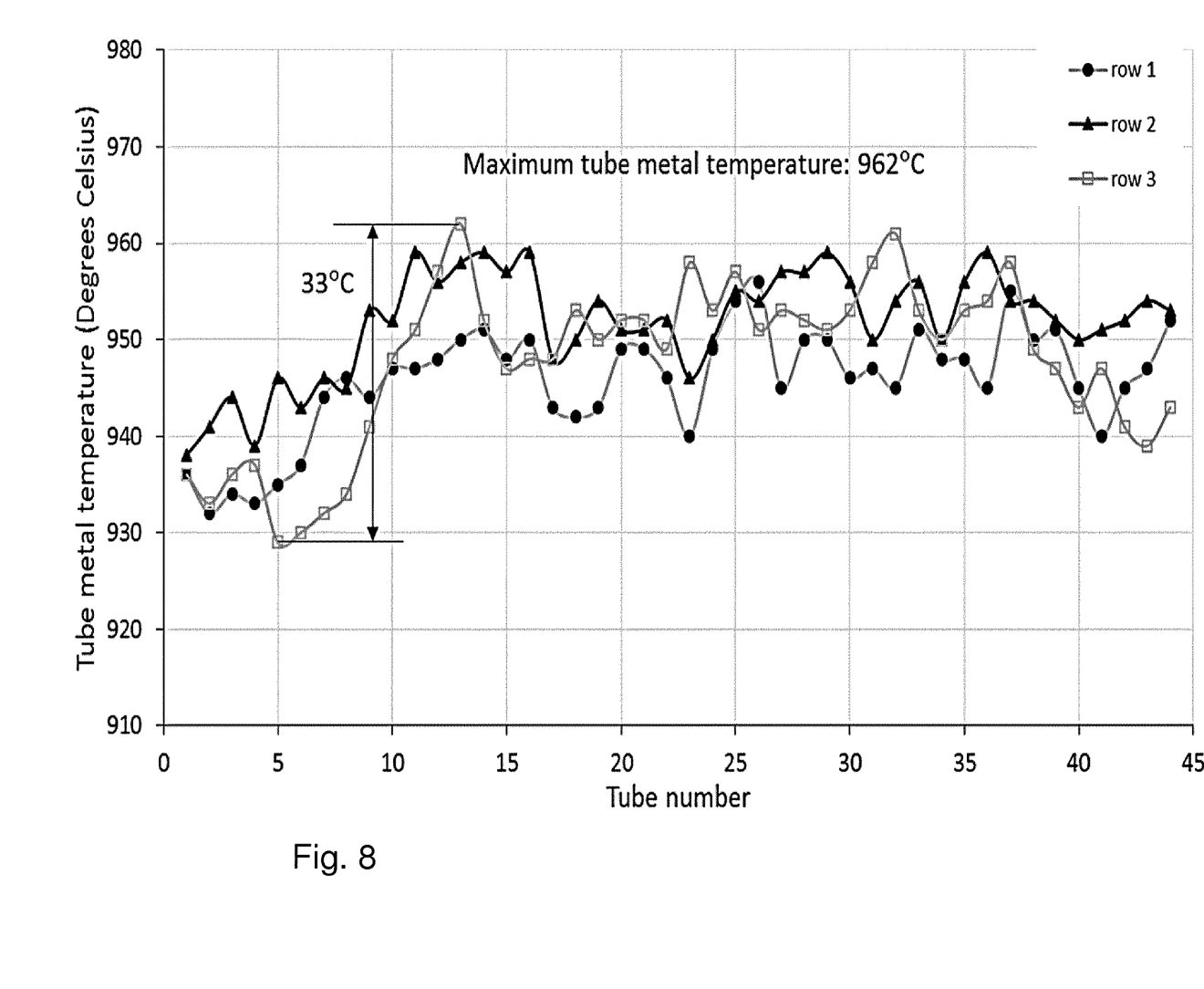
FIG. 8 is a graph showing the tube metal temperature in a reformer furnace with flow regulators positioned as in the configuration on the right of FIG. 5 (Case C).
Figure 9:
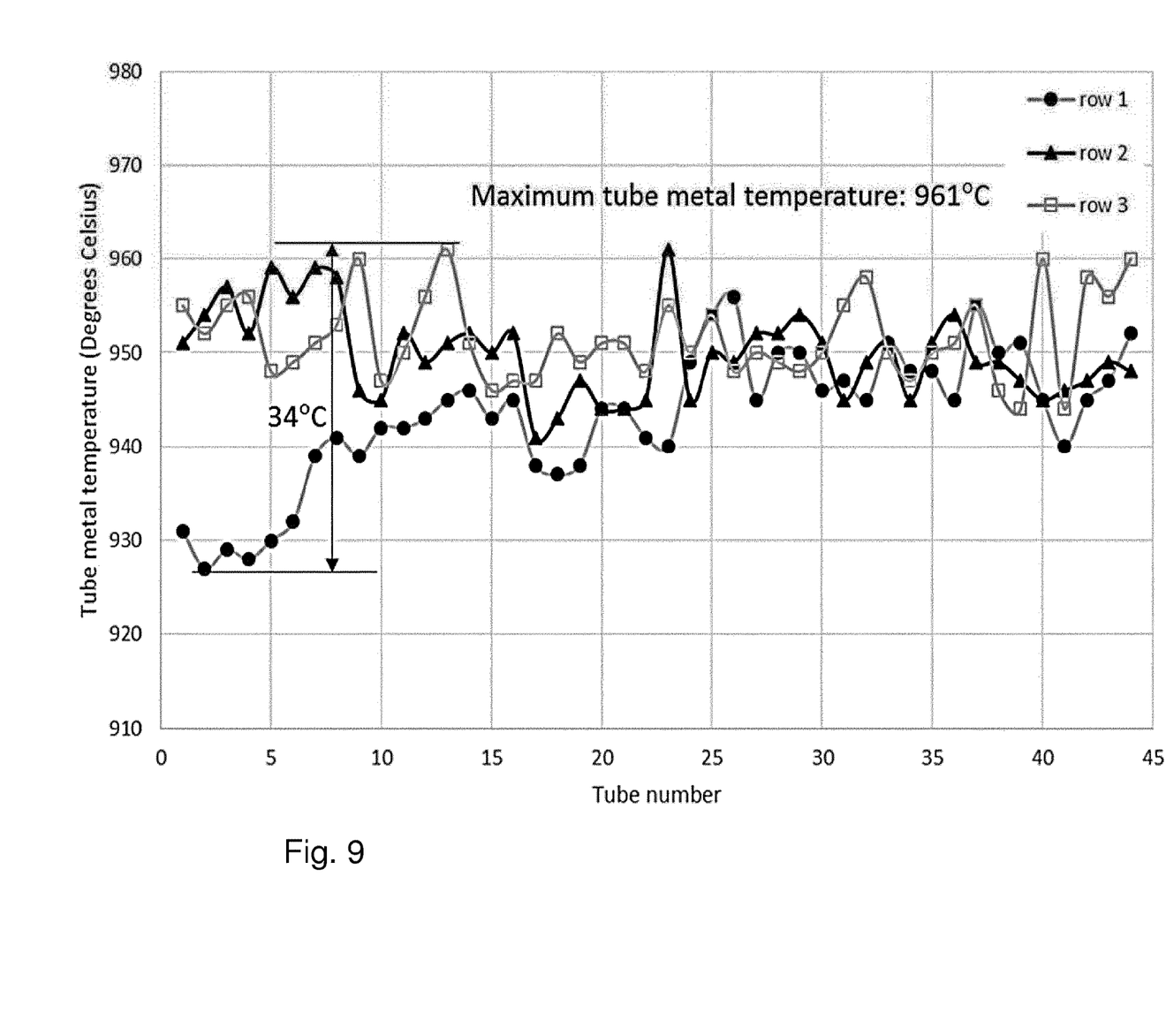
FIG. 9 is a graph showing the tube metal temperature in a reformer furnace not according to the invention, wherein the furnace has a configuration according to the left top view of FIG. 5, except that the flow in the coldest half of the reformer tubes was reduced with flow regulators, as taught by EP2671634.

The tube metal temperatures for case C are plotted in the FIG. 8. The flow rate to the outer lane (row 1) was reduced by the two flow devices and as consequence the tube wall temperatures increased. The flow device in two gas header parts was manipulated differently resulting in a slightly lower flow to the gas header part feeding tubes 1 to 21 compared to the other gas header part feeding tubes 22-44. The outer lane (row 1) shows comparable temperature on average (946° C.) compared to the other tube lanes (952° C. for row 2 and 948° C. for row 3). The maximum spread observed in tube metal temperatures at the level where it is measured is decreased to 33° C., with a maximum tube temperature value of 962° C., decreased by 9° C. compared to case A.

The tube metal temperatures for case D are plotted in the FIG. 5. Case D is obtained after installation of a calibrated restriction orifices or flow regulators in 50% of the tubes that have been identified as the cold tubes. The outer lane (row 1) still shows slightly lower temperature on average (943° C.) compared to the other lanes (950° C. for row 2 and 952° C. for row 3). The maximum spread observed in tube metal temperatures at the level where it is measured is decreased to 34° C., with a maximum tube temperature value of 961° C., decreased by 10° C. compared to case A. Compared to case B and C, the tube maximum tube metal temperature is marginally improved, while the temperature spread observed over the furnace is at par compared to case C.

The case D has the major inconvenience that the orifices may be placed only after identification of the cold tubes. The reason why the tubes are cold may be related partly related to the loading of the catalyst. It is known that the catalyst must be replaced several times during the lifetime of the reformer and therefore case D imposes the replacement of the restriction orifices at each refill, after identification of the cold tube. In addition the number of flow regulators is very high compared to the cases B and C. Therefore it is believed that the installation of control devices in the inlet gas header system (gas header and/or gas distributor) may provide an affordable practical way to obtain a very significant reduction in maximum tube temperature as well as a reduction in the tube temperature spread in the furnace.

Compared to case D, the cases B and C allow to reach the desired target by using less equipment, that may be controlled on line and adjusted as a function of the feed conditions (when feedstock quality changes) and throughput.

The invention claimed is:

1. Method for heating a process gas in a top or bottom fired reformer comprising one or more burners, two outer lanes of reformer tubes, and one or more inner lanes of reformer tubes, each reformer tube comprising an inlet, the method comprising flowing process gas through the reformer tubes of the inner and outer lanes,
    wherein each lane has a lane flow rate, which is defined as the total amount of process gas that flows through the reformer tubes of said lane per unit time,
    wherein the lane flow rate of at least one outer lane is different from the lane flow rate of at least one inner lane and controlled in operando in dependence of a monitored temperature spread over an output of the two outer lanes of reformer tubes and the one or more inner lanes of reformer tubes, by having set the lane flow rate of said outer tube lane upstream of the reformer tube inlets in a gas header that is positioned outside a firebox of the reformer and that is arranged for providing said at least one outer lane with process gas, or upstream thereof, and
    wherein a flow regulator is provided
        at an inlet of the gas header of the at least one outer lane; or
        at a tube inlet of a tube that provides process gas to the gas header of the at least one outer lane.

2. Method according to claim 1, wherein said gas header for providing the reformer tubes in said lane with process gas, the gas header has
    at least one inlet for process gas to enter the gas header; and
    multiple outlets for process gas to exit the gas header and be fed to the reformer tubes of the at least one outer lane;
    wherein each reformer tube of said at least one outer lane is fluidly connected to at least one of the outlets of the gas header, and
    wherein the gas header is provided with a process gas at a flow rate such that the at least one outer lane has a different lane flow rate from the at least one inner lane.

3. Method according to claim 1, wherein the outer lane is provided with a lane flow rate that is different from the lane flow rate of the at least one inner lane by setting the flow rate at which the gas header of said outer lane is provided with process gas.

4. Method according to claim 3, wherein a flow regulator is used to provide the lane flow rate of the at least one outer lane different from the lane flow rate of the at least one inner lane, wherein the flow regulator partially blocks or obstructs the flow of process gas provided to the gas header of the at least one outer lane.

5. Method according to claim 4, wherein the flow regulator is an insert, a valve, a plate, an orifice plate, a restriction orifice or a venturi nozzle.

6. Method according to claim 1, wherein the lane flow rate is or has been set by providing a flow regulator upstream of the reformer tubes.

7. Method according claim 1, wherein each lane of reformer tubes comprises a gas header for providing the reformer tubes in the lane with process gas, each gas header having
- at least one inlet for process gas to enter the gas header and
- multiple outlets for process gas to exit the gas header and be fed to the reformer tubes,
- wherein each reformer tube of a certain lane is fluidly connected to one of the multiple outlets of the gas header of that same lane, and
- wherein the reformer further comprises a gas distributor for distributing process gas over the gas headers, wherein the gas distributor comprises
- at least one inlet for process gas to enter the gas distributor,
- multiple outlets for process gas to exit the gas distributor and be fed to the gas headers,
- wherein each gas header inlet is fluidly connected to one of the multiple outlets of the gas distributor,
- wherein the lane flow rate of the at least one outer lane is different from the lane flow rate of the at least one inner lane by creating a pressure drop between the gas header of the at least one outer lane and the gas distributor, wherein the pressure drop is preferably created by a flow regulator.

8. Method according to claim 1, wherein one or both outer lanes have a lane flow rate that is different from any one inner lane.

9. Method according to claim 1,
- wherein one or both outer lanes have a lane flow rate that is 90-99%, for example 95-98%, of the lane flow rate of the inner lane with the highest lane flow rate; or
- wherein one or both outer lanes have a lane flow rate that is 101-110%, for example 102-105%, of the lane flow rate of the inner lane with the lowest lane flow rate.

10. Method according to claim 1,
- wherein one or both outer lanes have a lane flow rate that is 90-99%, for example 95-98%, of the lane flow rate of any of the inner lanes; or
- wherein one or both outer lanes have a lane flow rate that is 101-110%, for example 102-105%, of the lane flow rate of any of the inner lanes.

11. Method according to claim 1, wherein the difference in lane flow rate between the two outer lanes is less than 0.5%, preferably less than 0.1%, based on the outer lane with the lowest lane flow rate.

12. Method according to claim 1, wherein said one or more inner lanes comprise two first inner lanes and one or more further inner lanes, wherein each first inner lane is adjacent to one outer lane and to one further inner lane, and
- wherein one or both first inner lanes have a lane flow rate that is both different from the lane flow rate of the outer lane adjacent to it and from the lane flow rate of the further inner lane adjacent to it.

13. Method according to claim 1, wherein the burners located adjacent to a side wall of the reformer chamber may have one or more injection properties different from the burners that are not located adjacent to a wall of the reformer chamber,
- wherein the one or more injection properties are selected from the group consisting of the angle of the oxidant injector, the angle of the fuel injector, the flow rate at which the oxidant leaves the oxidant injector, the flow rate at which the fuel leaves the fuel injector, the amount of oxidant injectors, the location of the oxidant injectors, the amount of fuel injectors and the location of the fuel injectors.

14. Method according to claim 1, wherein said at least one outer lane comprises a gas header for providing the reformer tubes in said lane with process gas, wherein the difference in lane flow rate is achieved by setting or having set the flow rate at which the gas header of said certain tube lane provides the reformer tubes in said lane with process gas.

15. Method according to claim 1, wherein a flow regulator is set—and if necessary—to adjust the flow rate at which process gas is provided to the gas header of a certain tube lane dependent on the temperature of the process gas leaving said certain tube lane.

16. Method according to claim 1, comprising controlling a temperature distribution over the reformer, said controlling comprising comparing a difference in temperature between the process gas leaving the different reformer tube lanes and adjusting—if necessary—said lane flow rate of at least one outer lane.

* * * * *